United States Patent [19]
Gilbert

[11] 3,961,920
[45] June 8, 1976

[54] GAS ADSORBER CELL TEST SAMPLER

[76] Inventor: Humphrey Gilbert, P.O. Box 704, McLean, Va. 22101

[22] Filed: Jan. 24, 1974

[21] Appl. No.: 436,184

[52] U.S. Cl. ............................ 55/387; 23/254 R; 55/74; 73/421 R; 176/37
[51] Int. Cl. .............................................. B01d 53/14
[58] Field of Search .............. 55/74, 179, 208, 270, 55/387; 176/37; 73/421.5 R, 421 R

[56] References Cited
UNITED STATES PATENTS

| | | | |
|---|---|---|---|
| 2,024,076 | 12/1935 | Thomas | 220/85 |
| 2,860,784 | 11/1958 | Breithaupt | 210/75 |
| 2,895,613 | 7/1959 | Griffiths | 210/130 |
| 3,011,336 | 12/1961 | Weiss | 73/29 |
| 3,091,969 | 6/1963 | Romanchuk et al. | 73/425.2 |
| 3,411,273 | 11/1968 | Duncan et al. | 55/387 |
| 3,496,777 | 2/1970 | Packer | 73/422 |
| 3,581,476 | 6/1971 | Rivers | 55/387 |
| 3,686,835 | 8/1972 | Strange et al. | 55/270 |

*Primary Examiner*—Charles N. Hart
*Assistant Examiner*—Ethel R. Cross
*Attorney, Agent, or Firm*—Bell, Seltzer, Park & Gibson

[57] ABSTRACT

A gas adsorber cell for use in high efficiency gas cleaning systems and the like, and having provision for obtaining a representative and undisturbed sample of the adsorbent material to permit periodic testing of the efficacy of the adsorbent material. The adsorber cell comprises an enclosure including a pair of spaced perforated sheets adapted to receive an adsorbent material therebetween, a sample holder also adapted to be filled with the adsorbent material and having perforated opposite ends, and means for removably mounting the sample holder between the sheets such that a representative portion of the gas passing through the adsorber cell passes through the sample holder. The holder may then be removed to permit periodic testing of the adsorbent material carried therein.

19 Claims, 10 Drawing Figures

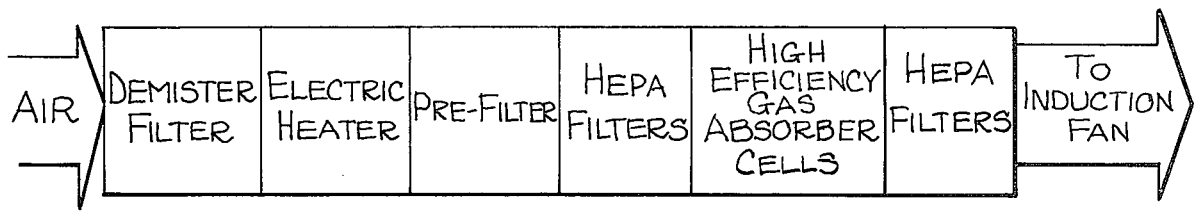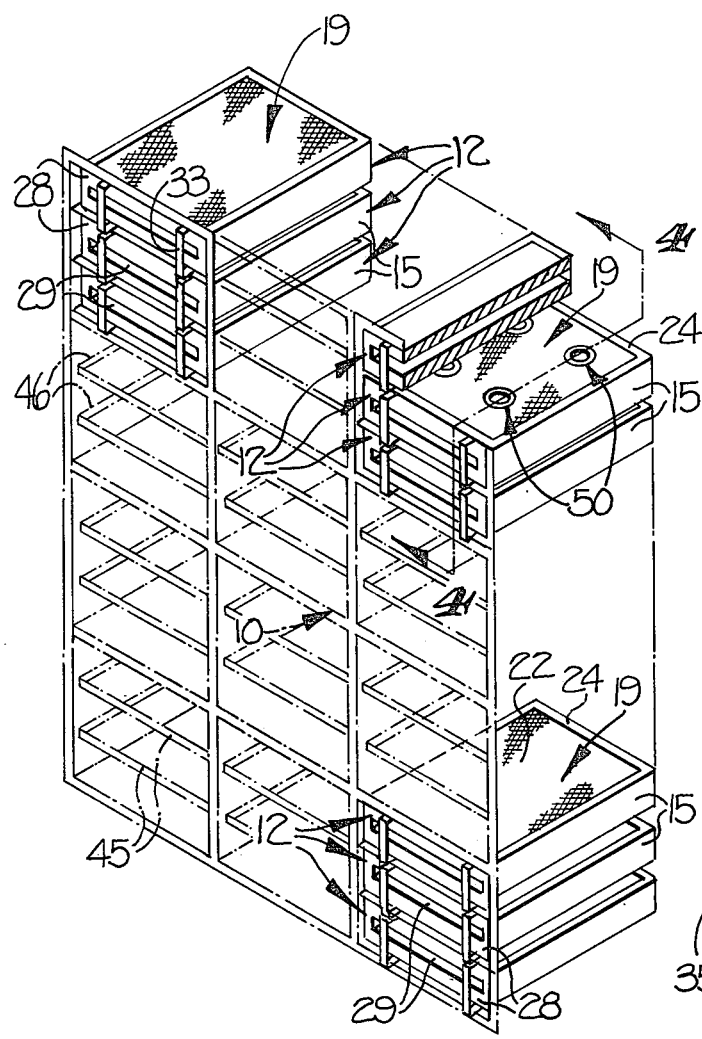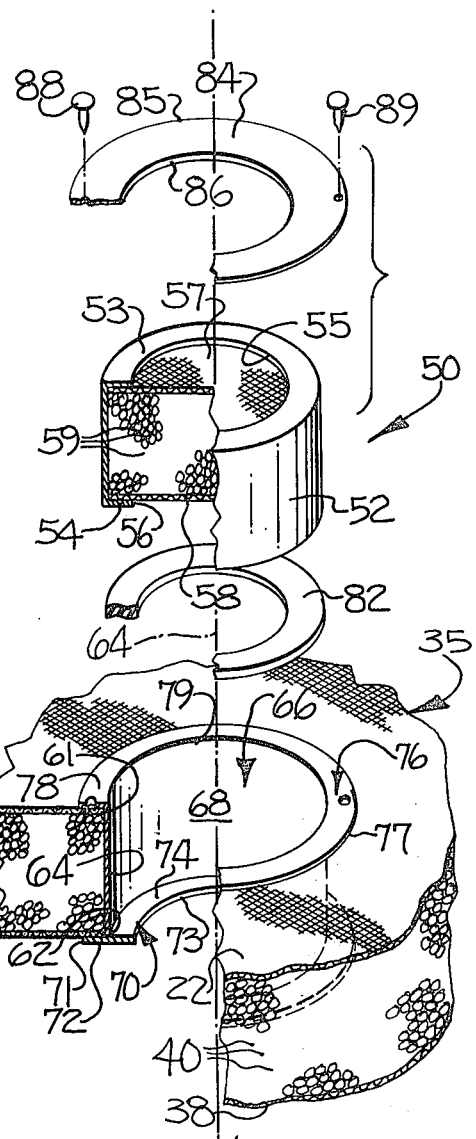

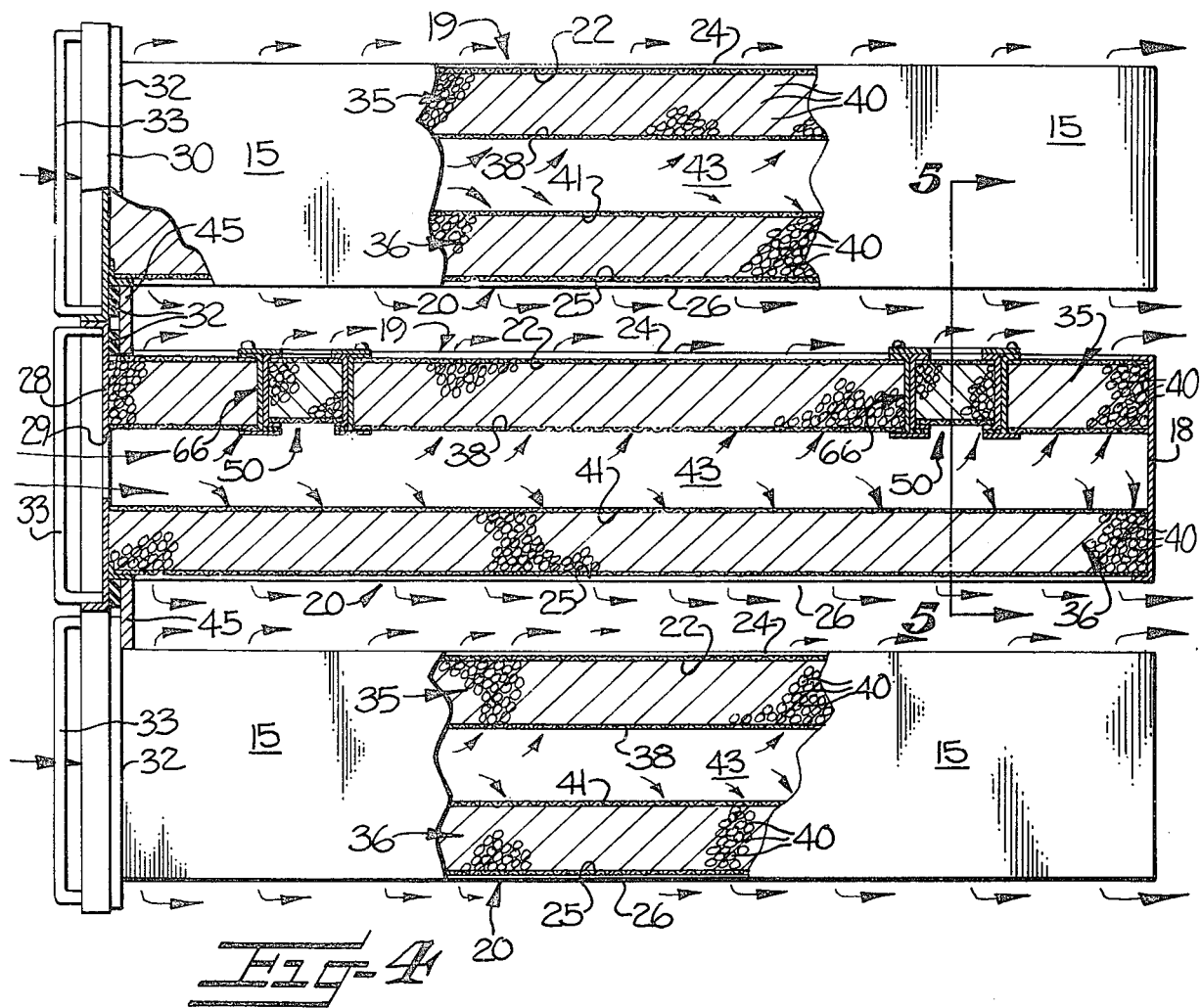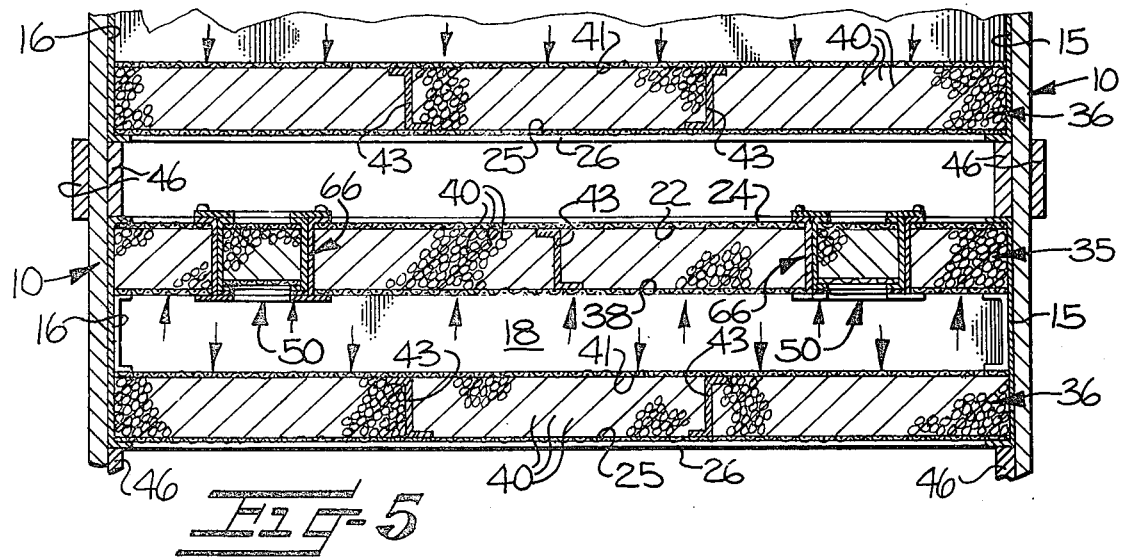

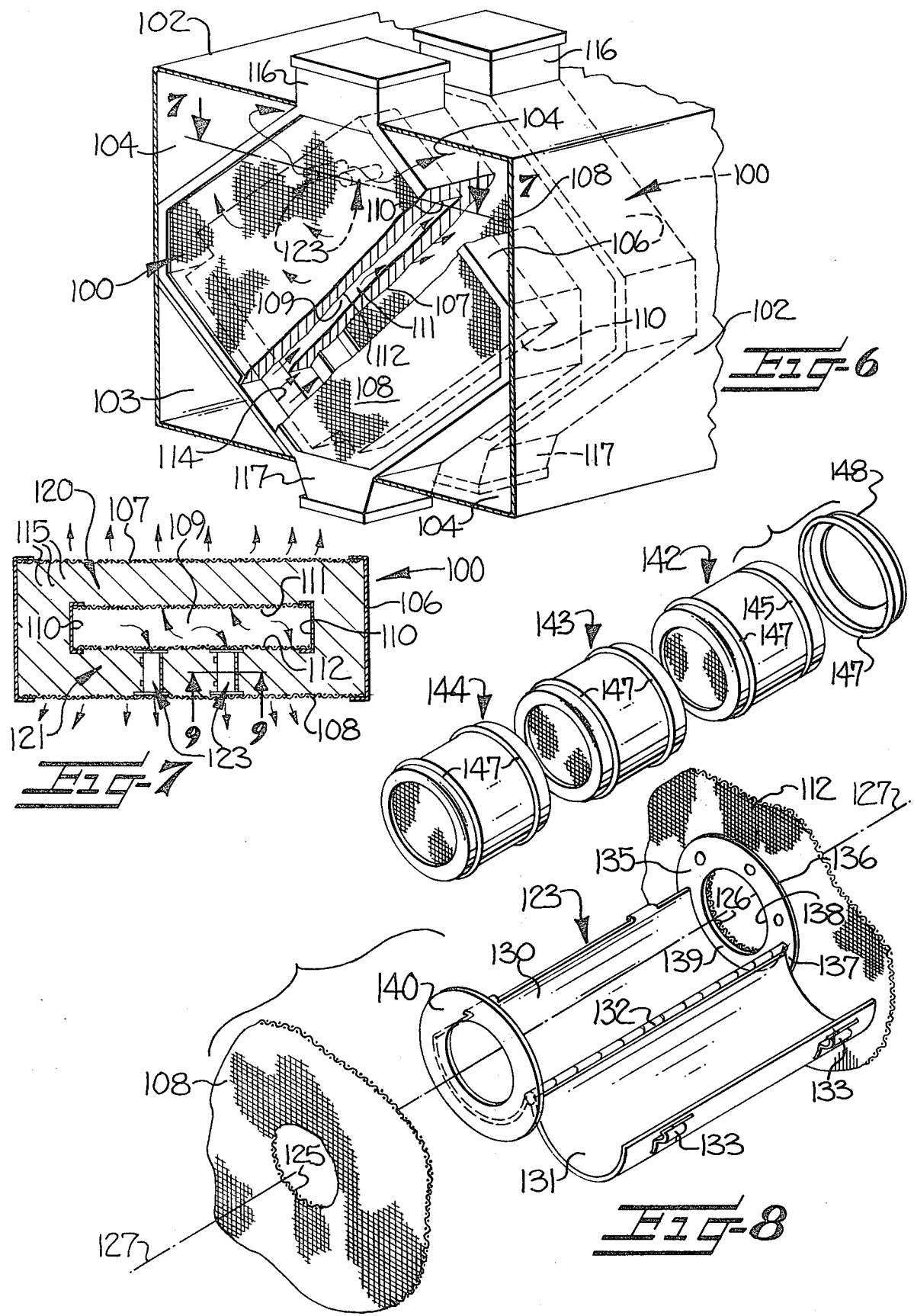

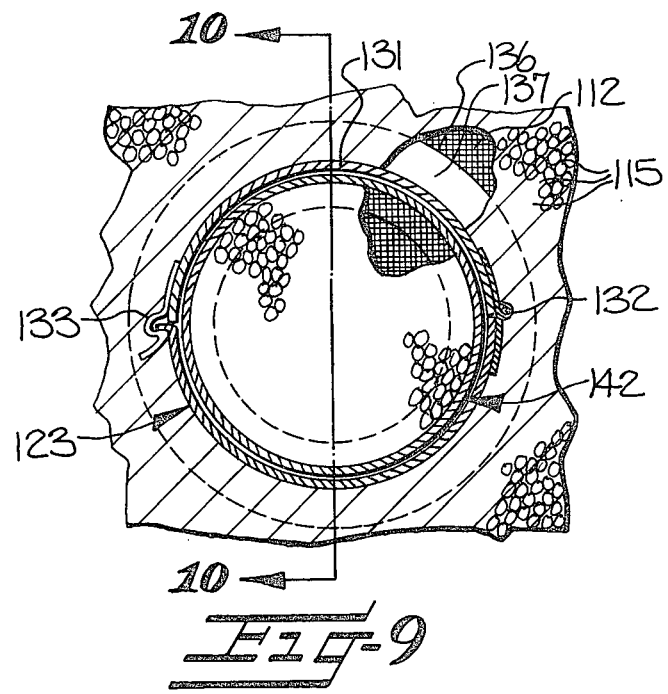
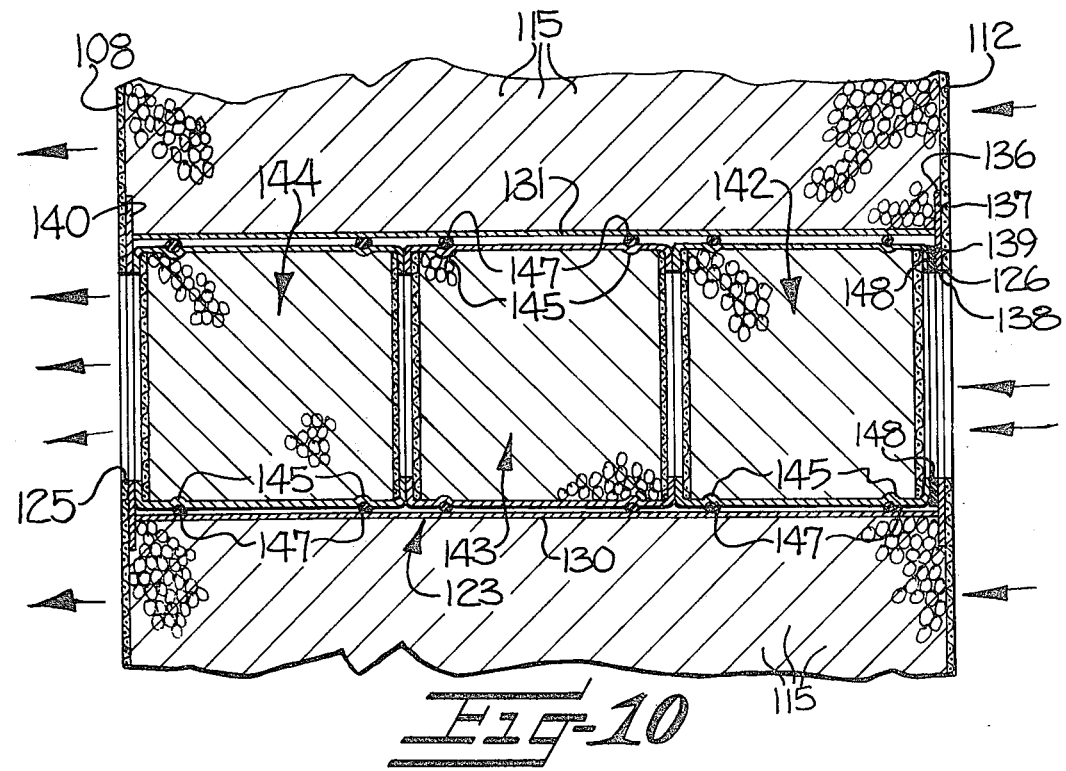

GAS ADSORBER CELL TEST SAMPLER

The present invention relates to a gas treatment system which is useful, for example, in association with nuclear reactors to prevent discharge of potentially radioactive material into the atmosphere. More particularly, the invention relates to a gas adsorber cell having provision for readily providing a representative and undisturbed sample of the adsorbent material for test and evaluation purposes.

In nuclear power generators, it is accepted practice to provide a gas treatment system which is designed to remove radioactive material that may be released in an accident. Typically, such systems include one or more cells or beds containing an adsorbent material such as activated charcoal or the like, and which is capable of removing gaseous iodine (elemental iodine and organic iodides) from the air passing therethrough.

It is recognized that periodic testing of the efficacy of the charcoal adsorbent material is necessary in order to give assurance of the continued performance of the cell since the charcoal deteriorates upon aging. Such periodic testing is conventionally achieved by withdrawing random samples from the cell by means of a hollow tube or "grain theif" sampling device which is inserted into the cell. The withdrawn sample is then tested in accordance with accepted Atomic Energy Commission procedures, and if the tests prove unsatisfactory, the cell is drained and refilled with fresh charcoal.

Since drainage and refilling of the cell is an expensive and time consuming operation, it is important that the periodic tests provide accurate results so that unnecessary drainage and refilling may be avoided. The above conventional sampling procedure is not totally satisfactory in this regard, however, since the "grain theif" disturbs the bed during the insertion and withdrawal operations. Thus there is no way to tell exactly where the withdrawn sample was originally located in the bed, and it is important to orderly testing that the location of samples be identifiable.

It has also been proposed to provide for the testing of the adsorbent material in the cells by suspending isolated samples of the adsorbent material in the gaseous flow stream. While such procedure avoids the above noted problems associated with the use of a "grain theif", the samples are not necessarily exposed to the same flow as the cells since there is no channeling of the flow stream through the sample. Thus a truly representative sample cannot be assured.

It is accordingly an object of the present invention to provide a gas adsorber cell which includes provisioon for providing a sample of the adsorbent material which accurately reflects the contaminant removal efficiency of the adsorbent material in the main body of the cell.

It is a further object of the present invention to provide a gas adsorber cell which includes a removably mounted sample holder which is exposed to substantially the same velocity and pressure differential as the main body of adsorbent material so that the adsorbent material in the sample holder is representative of the adsorbent material in the cell, and is also representative of the condition of the adsorbent material in other similar cells in the same system.

It is another object of the present invention to provide a gas adsorber cell which includes a sample holder which is easily removable from the bed without disturbing the adsorbent material in the holder.

It is still another object of the present invention to provide a gas adsorber cell including a sample holder which is exposed to an air flow representative of the air flow through the cell, and which does not significantly block the flow to thereby upset the required residence time of the air in the cell by increasing the velocity thereof.

These and other objects and advantages of the present invention are achieved in the embodiments illustrated herein by the provision of a gas adsorber cell which comprises an enclosure for receiving the adsorbent material therein, the enclosure including a pair of perforated sheets disposed in spaced apart parallel relationship. A sample holder is removably mounted between the perforated sheets and is adapted to be filled with an adsorbent material. The holder comprises perforated top and bottom end walls, and is disposed within the enclosure such that the end walls are parallel to the two perforated sheets and such that a representative portion of the gas passing transversely through the adsorber cell passes through the sample holder. The holder may thus be removed to permit the testing of the adsorbent material carried therein.

Some of the objects and advantages of the invention having been stated, others will appear as the description proceeds when taken in connection with the accompanying drawings, in which FIG. 1 is a schematic flow diagram of a typical gas treatment system adapted for use in a nuclear power generator;

FIG. 2 is a fragmentary perspective view of a bank of high efficiency gas adsorber cells of the flat bed or tray type;

FIG. 3 is a fragmentary exploded view of the sample holder and receptacle as used in the adsorber cells shown in FIG. 2;

FIG. 4 is a partially sectioned side elevation view taken substantially along the line 4—4 of FIG. 2 and illustrating the air flow pattern through the adsorber cells;

FIG. 5 is a sectional view taken substantially along the line 5—5 of FIG. 4;

FIG. 6 is a perspective, partly sectioned, view of a bank of high efficiency gas adsorber cells of the upright type;

FIG. 7 is a sectional plan view taken substantially along the line 7—7 of FIG. 6;

FIG. 8 is a fragmentary exploded view of a portion of one of the cells shown in FIG. 6 and illustrating the manner in which three sample holders may be mounted in tandem within the cell;

FIG. 9 is a sectional end view of the receptacle and sample holder and taken substantially along the line 9—9 of FIG. 7 and FIG. 10 is a sectional elevation view of the receptacle and sample holder and taken substantially along the line 10—10 of FIG. 9.

Referring more specifically to the drawings, FIG. 1 is a schematic flow diagram which represents a conventional gas treatment system designed for use in association with nuclear power generators. Since the present invention relates to only one of the components of the system, i.e., the gas adsorber cells, the remaining portions will be only briefly described. It should be understood however, that the gas adsorber cell of the present invention is not limited to nuclear applications, and would be useful wherever a gas stream is passed through an adsorbent bed.

As shown in FIG. 1, the incoming air stream initially passes through a demister filter which is designed to remove any free droplets of water or mist therefrom, and then through an electric heater to reduce the relative humidity of the air to a desired level. A pre-filter is installed downstream of the electric heater and is designed to remove the larger dust particles, and a bank of high efficiency particulate air (HEPA) filters is installed downstream of the pre-filters for removal of the sub-micron sized particles from the air. The gas adsorber cells are positioned downstream of the HEPA filters, and a second bank of HEPA filters is positioned downstream of the gas adsorber cells to prevent any charcoal dust originating in the adsorber cells from being carried outwardly with the exhaust air.

One embodiment of a bank of high efficiency gas adsorber cells for use in a gas treatment system of the described type and in accordance with the present invention is illustrated somewhat schematically in FIGS. 2–5. As shown, the bank comprises an upright cabinet-like mounting frame 10 positioned within a filter housing duct (not shown) such that the air passes horizontally therethrough. The mounting frame removably mounts a number of individual gas adsorber cells or trays 12, the cells being horizontally slideable into the mounting frame in a manner more fully described below.

Each of the cells 12 comprises a generally rectangular casing defined by two imperforate opposite side faces 15 and 16, an imperforate rear end face 18, a top face 19, and a bottom face 20. The top face 19 comprises a perforated flat sheet or screen 22, and a peripheral margin or flange 24 to which the sheet is attached. The bottom face 20 comprises a similar perforated sheet 25 and peripheral flange 26.

A face plate 28 forms the front face of the cell and includes a horizontal slot 29 which communicates with the interior of the casing as more particularly described below. The face plate 28 extends beyond the periphery of the side, top, and bottom faces of the casing to define a rearwardly facing flange 30, and a peripheral sealing gasket 32 is carried by the flange 30. Also, a pair of handles 33 is mounted to the face plate to facilitate handling and installation of the cell.

Each cell 12 further comprises two spaced, parallel enclosures 35 and 36 positioned within the casing. Viewing FIG. 4, the upper enclosure 35 of each cell comprises the top perforated sheet 22, and an interior perforated sheet or screen 38 of like construction and disposed in spaced apart parallel relationship to the top sheet 22. The enclosure is further bounded by the side faces 15 and 16, the rear end face 18, and face plate 28, and the two sheets 22 and 38 are mechanically fastened by any suitable arrangement within the casing, as by welding. A granulated adsorbent material 40, such as activated charcoal, is carried within the enclosure under sufficient pressure to prevent motion of the charcoal granules.

The lower enclosure 36 of each cell is generally similar to the above described upper enclosure 35, and comprises the bottom perforated sheet 25, and an interior perforated sheet or screen 41 of like construction. The two perforated sheets of each enclosure are maintained in the desired spaced apart, parallel relationship by means of one or more Z-shaped spacer bars 43 which may be suitably attached to the sheets and which extend longitudinally from front to rear through the interior of the enclosures as best seen in FIG. 5. Alternately, the perforated sheets could be held in the desired orientation by means of a centrally located through bolt (not shown).

By design, the slot 29 communicates with the open area between the two enclosures 35 and 36 such that the air may enter through the slot, move freely in the longitudinal direction, and then pass transversely through one or the other of the enclosures, note FIG. 4. However, it will be understood that the cells could be oriented in the housing duct so that the air passes in the reverse direction. Also, each cell may be provided with a suitable filling hatch (not shown) in, for example, the rear end face 18, to permit removal and refilling of the adsorbent material 40.

The mounting frame 10 includes a plurality of rectangular openings defined by the outwardly facing flanges 45, each opening being of a size to permit the casing of a cell to be received therein in an operative position as shown in FIGS. 2 and 4–5, and wherein the sealing gasket 32 of the cell is compressed between the flange 30 of the cell and the mating flange 45 of the mounting frame. A suitable clamping arrangement (not shown) may be provided on the mounting frame to maintain the cells in such operative position. In addition, the mounting frame includes longitudinally extending support rails 46 associated with each opening (note FIG. 5) such that the cell may be horizontally slid into and out of the mounting frame when servicing or testing of the cell is required.

As noted above, the perforated sheets 22, 25, 38, and 41 are of like construction, and are typically fabricated from flat metallic sheet material. The perforations may be in the form of a large number of round openings arranged in a uniform pattern. Alternately, the sheets may comprise a wire mesh cloth. In either event, the open area of the sheets should be at least about 30% to minimize air resistance. The overall dimensions of the cell (less the face plate) are typically about 24 inches in width, 30 inches in length, and 6.3 inches in height. The thickness of the bed of adsorbent material in each of the enclosures 35 and 36 is about 2 inches, and the two enclosures are spaced uniformly about 2 inches apart.

In accordance with the present invention, at least some of the adsorber cells carried in the mounting frame include a removably mounted sample holder 50 to permit periodic testing of the efficacy of the adsorbent material 40 in the enclosures. Typically, only a few of the cells in the mounting frame will have a sample holder, and while four sample holders are shown in association with one of the cells in the drawings, it will be appreciated that a smaller or larger number of holders could be positioned in one cell if found desirable.

As best seen in FIG. 3, each sample holder 50 comprises an imperforate cylindrical side wall 52 having inturned top and bottom ends to define inwardly directed top and bottom imperforated circular flanges 53 and 54 respectively. The flanges 53 and 54 in turn define circular inner openings 55 and 56 respectively which have substantially the same diameter, and a circular perforated sheet is positioned to underlie each of the flanges to define perforated top and bottom end walls 57 and 58 respectively. The enclosure defined by the side wall 52 and end walls 57 and 58 is filled with an adsorbent material 59 which corresponds to the particular type of adsorbent material 40 in the associated bed. The perforated end walls may, if desired, be physically attached to the flanges 53 and 54, or the assembly may be maintained merely by the slight compressive force maintained on the adsorbent material by the flanges. In addition, the end walls 57, 58 of the sample holder are each fabricated from a material which corresponds to the material of the performated sheets 22, 25, 38 and 41 of the cell so as to have substantially the same percentage of open area therein and resistance to the air flow. As will become apparent, this arrangement assures that the gas flow rate per unit area through the holder will be substantially the same as the gas flow rate per unit area through the bed.

In the illustrated embodiment, the longitudinal dimension or height of the sample holder 50 generally conforms to the thickness of each of the enclosures 35 and 36 in the cell such that the thickness of the adsorbent material will be substantially the same in both the sample holder and enclosures. Thus in the above described example, the sample holder will have a height of about 2 inches, and a diameter of about 2½ inches.

Again viewing FIG. 3, the perforated sheets 22 and 38 of the enclosure 35 include first and second circular apertures 61 and 62 respectively, the apertures 61 and 62 having substantially the same diameter and being transversely aligned to define a transverse axis 64. A receptacle 66 for removably mounting the sample holder 50 within the enclosure 35 is positioned to extend between the first and second apertures 61 and 62. The receptacle 66 comprises a cylindrical imperforate side wall 68 disposed coaxially about the transverse axis 64 and defining a forward end adjacent the first aperture 61 and a bottom end adjacent the second aperture 62. An imperforate circular flat bottom flange 70 is fixedly connected to the bottom end of the side wall 68 and lies perpendicular to the transverse axis 64. More particularly, the bottom flange 70 defines a circular outer edge 71 which lies coaxial with the transverse axis and has a diameter greater than that of the side wall 68 and the second aperture 62 to thereby define an outer flange portion 72 which overlies that portion of the second sheet 38 immediately surrounding the second aperture. Preferably, the outer flange portion 72 is fixedly attached to the contiguous sheet 38, as by welding or other means of attachment. The bottom flange 70 further includes a circular inner opening 73 coaxial with the transverse axis 64 and having a diameter less than the second aperture 62 in the sheet 38 to define an inner flange portion 74 which lies radially within the second aperture.

The receptacle 66 further comprises an imperforate circular flat top flange 76 fixedly connected to the top end of the side wall 68 and lying perpendicular to the transverse axis 64. The top flange 76 defines a circular outer edge 77 coaxial with the transverse axis and having a diameter greater than that of the side wall 68 and first opening 61 in the sheet 22 to thereby define an outer flange portion 78 overlying and suitably attached to that portion of the sheet 22 immediately surrounding the first aperture 61. The top flange 76 also includes a circular inner opening 79 coaxial with the transverse axis and having a diameter substantially corresponding to the inner diameter of the cylindrical side wall 68 of the receptacle. This diameter is only slightly greater than the outside diameter of the side wall 52 of the sample holder 50 such that the sample holder may be inserted into an operative position within the receptacle 66 along the transverse axis 64 through the first aperture 61 and the circular inner opening 79 of said top flange 76.

The receptacle 66 further includes a circular sealing ring 82 which is adapted to overlie the inner circular flange portion 74 of the bottom flange 70 to thereby provide a gas tight seal between the bottom flange 70 and the adjacent inwardly directed flange 54 of the sample holder 50 when the sample holder is positioned in the operative position as shown in FIGS. 4 and 5. A flat ring cover plate 84 is also provided to maintain the sample holder 50 in its operative position within the receptacle 66. The cover plate defines a circular outer edge 85 having a diameter substantially corresponding to that of the circular outer edge 77 of the top flange of the receptacle, and a circular inner opening 86 having a diameter substantially corresponding to that of the circular inner opening 73 of the bottom flange 70. In this regard, it will be noted that the inner openings 55 and 56 defined by the top and bottom flanges 53 and 54 of the sample holder 50 have a diameter substantially equal to the diameter of the circular inner opening 86 of the cover plate 84 and the circular inner opening 73 of the bottom flange 70. To releasably connect the cover plate 84 to the top flange 76, there is provided a pair of threaded members 88, 89 which are adapted to freely pass through suitable openings in the cover plate 84 and threadedly engage aligned openings in the top flange 76.

From the above description, it will be apparent that the outer flange portion 72 of the bottom flange 70 of the receptacle, together with the top flange 76 thereof, serve as baffles to substantially prevent the gas passing transversely through the enclosure 35 from channeling between the adsorbent material 40 in the enclosure and the side wall 68. Similarly, the inner flange portion 74 of the bottom flange 70 of the receptacle, together with the top and bottom circular flanges 53, 54 of the sample holder 50 serve a similar function in preventing the gas from channeling between the adsorbent material 59 in the holder and the side wall 52.

Where a number of receptacles and sample holders are mounted in a particular cell, it will be appreciated that the area covered by the bottom flange 70 will somewhat impede the passage of air through the cell, and this impedance will have a tendency to speed the gas therethrough and thus shorten the residence time of the gas in the bed. The residence time is an important factor in insuring the removal of any radioactive compounds, and typically is about 0.25 seconds for a cell of the above described type and size. To avoid any such upsetting of the residence time, the area covered by the spacer bars 43 may be reduced to compensate for the area of the flange 70, or one or more of the spacer bars may be eliminated in the enclosure containing the sample holders as illustrated in FIG. 5.

The material employed in constructing the receptacles and sample holders is generally conventional, and typically comprises a metal such as stainless steel. Also, while the sample holder which has been illustrated has end walls having inturned flanges 53, 54 which are integrally formed with the side wall 52, it will be understood that the end walls could comprise a removable screw cap or the like to facilitate emptying and refilling of the adsorbent material.

In use, the air passing through the bank of cells 12 will enter through the slot 29 of each cell and pass through one or the other of the beds defined by the enclosures 35, 36 and in the manner shown in FIG. 4. Since the sample holders 50 are exposed to the same rate of gas flow as the remainder of the bed, the adsorbent material 59 within the holders will faithfully represent the contaminant adsorption in the remainder of the bed, and will also faithfully represent the distribution of the adsorption between the entry and discharge sides of the bed. When it is desired to test this contaminate level, a technician enters the duct and withdraws one of the cells which contains the sample holders from the mounting frame 10. Typically, one sample holder is then removed and tested intact by a conventional non-destructive testing procedure, such as scanning for radioactivity. If the test proves satisfactory, a new sample holder is inserted into the empty receptacle, and the cell replaced in the mounting frame. The same procedure can then be repeated at a later date by testing another of the original sample holders in the cell. If, however, the test indicates that the adsorption level is unsatisfactory, the adsorbent material in all of the cells would be replaced. The sample holders would also be replaced with adsorbent material taken from the same manufactured lot or batch with which the remainder of the bed is filled.

A second embodiment of a bank of high efficiency gas adsorber cells for use in a gas treatment system of the described type is illustrated in FIGS. 6-10. As shown in these figures, the bank comprises a number of upright filter bed assemblies 100 (two being illustrated in FIG. 6) mounted in parallel within a duct 102. The duct 102 includes an inlet plenum 103 for the incoming air and an outlet plenum 104 for the air which has passed through one of the assemblies 100.

Each of the assemblies 100 includes an outer periphery bounded by an imperforate, generally four-sided wall 106 arranged in a somewhat diamond shaped configuration, a first perforated sheet 107 disposed in a vertical plane along one side face, and a second perforated sheet 108 disposed in a vertical plane along the opposite side face and transversely spaced from the first sheet. An enclosed rectangular plenum 109 is centrally positioned within the assembly, the enclosed plenum being defined by the imperforate side wall 110 which bounds three sides thereof, a third perforated sheet 111 disposed parallel to and spaced from the first sheet 107, and a fourth perforated sheet 112 disposed parallel to and spaced from the second sheet 108. The interior of the enclosed plenum communicates with the inlet plenum 103 through the opening 114 as seen in FIG. 6 such that the air passing through the inlet plenum 103 may enter the enclosed plenum 109.

The space between the enclosed plenum 109 and outer periphery of the assembly 100 is filled with a suitable adsorbent material 115, and each assembly is provided with a filling hopper 116 to permit loading of the adsorbent material and a drainage chute 117 to permit removal of the same. Thus as best seen in FIG. 7, the air entering the enclosed plenum 109 will pass transversely through one or the other of a first enclosure 120 defined by the spaced parallel sheets 107 and 111, or the second enclosure 121 defined by the sheets 108 and 112. Typically, the transverse dimension of each of the enclosures 120 and 121 is about six inches, although other dimensions could be employed.

As illustrated, the second enclosure 121 mounts two identical sample holder receptacles 123, it being understood that a different number of receptacles could be employed if found desirable. As will become apparent, these receptacles are designed to permit the enclosed sample holders to be installed and removed along a direction parallel to the screens, i.e., vertically through the filling hopper 116. Such a practice is necessary in the illustrated embodiment since the duct 102 is otherwise permanently enclosed, and the technician would not have access to the interior thereof as is the case in the embodiment of FIGS. 2-5. Thus when it is desired to test the adsorbent material 115 within one of the assemblies 100, it is necessary to remove some of the adsorbent material through the drainage chute 117 until the receptacles 123 are exposed and so that the technician may reach through the filling hopper 116 and manually remove the desired number of sample holders. If the tests prove that the adsorbent level is satisfactory, the sample holders are replaced and the removed material is reloaded through the filling hopper. Otherwise, all of the adsorbent material is drained from the assembly and replaced with fresh material.

Referring specifically to FIGS. 8-10, each receptacle 123 is positioned to communicate with two apertures 125, 126 in the sheets 108, 112 respectively, the apertures 125, 126 defining a transverse axis 127 through the enclosure. The receptacle 123 comprises a cylindrical side wall disposed coaxially about the transverse axis, the side wall being split into two sections in the transverse direction to define an arcuate fixed lower section 130 and an arcuate cover section 131. The cover section 131 is pivotally connected to the lower section by the hinge 132 such that the cover section may be manually pivoted between a closed position as seen in FIG. 9 and an open position as seen in FIG. 8. A pair of releasable clamps 133 is provided along the opposite side edge to maintain the cover section in its closed position. Alternately, the hinge 132 could be eliminated and replaced by clamps along both side edges so that the cover section 131 may be lifted entirely away from the lower section when removing a sample holder.

Each receptacle 123 further includes an imperforate flat flange fixedly connected at each end of the side wall. More particularly, a flange 135 lies perpendicular to the transverse axis and is connected to the bottom or right end of the side wall as seen in FIGS. 8 and 10. The flange 135 also overlies that portion of the screen 112 which immediately surrounds the aperture 126, and it includes an outer circular edge 136 positioned radially outside of the side wall to thereby define an outer flange portion 137 which acts as a baffle to prevent the gas from channeling between the adsorbent material 115 in the enclosure 121 and the receptacle side wall. The flange 135 also includes an inner circular opening 138 positioned radially within the side wall to define an inner flange portion 139. A flange 140 of similar construction is attached at the opposite end of the side wall, and both flanges 135, 140 may be suitably attached to the inwardly facing side of the associated perforated sheet, as by welding.

Each receptacle 123 is designed to receive a total of three sample holders 142, 143, 144 in tandem in the manner best seen in FIG. 10. Each sample holder is generally similar to the sample holder 50 described above, with the exception that each holder includes a pair of spaced peripheral grooves 145 for mounting a peripheral sealing ring 147. Alternately, a single elongated sample holder having a length of about 6 inches, (not shown) could be substituted for the three illustrated holders. To further seal the sample holders within the receptacle, an additional sealing ring 148 is carried on the inner face of the flange 135 so as to be interposed between the inner flange portion 139 and the adjacent end wall of the sample holder 142.

From the above description, it will be apparent that both embodiments of the present invention are adapted to provide representative samples of the absorbent material which have been exposed simultaneously to the same service conditions as the adsorbent material in the main body of the cell. In this regard, the sample holders are mounted in an operative position wherein the top and bottom end walls are positioned parallel to the perforated sheets of the cell so that a representative portion of the gas passing through the cell passes through the sample holders. Also, the fact that the end walls of the sample holders and the perforated sheet of the cells are preferably constructed from like materials further serves to insure that the gas flow rate passing through the sample holders is representative of that passing through the main body of the cell.

In the drawings and specification, there has been set forth a preferred embodiment of the invention, and although specific terms are employed, they are used in a generic and descriptive sense only and not for purposes of limitation.

That which is claimed is:

1. A gas adsorber cell for use in high efficiency gas cleaning systems and the like and having provision for obtaining a representative and undisturbed sample of the adsorbent material to permit periodic testing of the efficacy of the adsorbent material, said adsorbent cell comprising,
   an enclosure including a pair of perforated sheets disposed in spaced apart, parallel relationship, said enclosure being adapted to receive an adsorbent material between said sheets such that a gas may be passed transversely through the sheets and absorbent material,
   a sample holder adapted to be filled with an adsorbent material and comprising a perforated top end wall, a perforated bottom end wall, said top and bottom end walls being disposed in spaced apart, parallel relationship with respect to each other, and a peripheral side wall extending between said top and bottom end walls, and
   means for removably mounting said sample holder within said enclosure and between said sheets in an operative position wherein said top and bottom end walls of holder are positioned parallel to said two perforated sheets, whereby a representative portion of the gas passing transversely through the adsorber cell passes through said sample holder, and said holder may be removed to permit the testing of the adsorbent material carried therein.

2. The gas adsorber cell as defined in claim 1 wherein said sample holder further comprises an inwardly directed imperforate flange carried by said peripheral side wall and overlying the periphery of one of said top and bottom end walls to substantially prevent the gas from channeling between the adsorbent material in said holder and said side wall.

3. The gas adsorber cell as defined in claim 2 wherein said enclosure further includes an aperture in each of said perforated sheets, said apertures being transversely aligned with each other, and said means for removably mounting said sample holder within said enclosure includes a receptacle fixedly mounted between said perforated sheets and in transverse alignment with said apertures, said receptacle being configured to closely surround said side wall of said sample holder to maintain the same in said operative position.

4. The gas adsorber cell as defined in claim 3 wherein said receptacle includes a side wall extending between said perforated sheets, and an outwardly directed imperforate flange carried by said receptacle side wall and overlying that portion of one of said perforated sheets immediately surrounding the associated aperture to thereby substantially prevent the gas from channeling between the adsorbent material in said enclosure and said receptacle side wall.

5. The gas adsorber cell as defined in claim 4 further including sealing means adapted to be interposed between said receptacle and said sample holder for substantially precluding the passage of gas therebetween.

6. The gas adsorber cell as defined in claim 5 wherein the percentage of open area in each of said perforated sheets and each of said perforated top and bottom end walls of said holder is substantially the same, such that the gas flow rate per unit area through said holder will be substantially the same as the gas flow rate per unit area through the remainder of said enclosure.

7. The gas adsorber cell as defined in claim 1 wherein said peripheral side wall of said sample holder is cylindrical and wherein said top and bottom end walls lie substantially perpendicular to the axis defined by said cylindrical side wall, and said cylindrical side wall includes an inturned circumferential imperforate flange adjacent each end thereof to overlie the periphery of the adjacent end wall and to substantially prevent the gas from channeling between the adsorbent material in said holder and said side wall.

8. The gas adsorber cell as defined in claim 7 wherein said enclosure further includes a circular aperture in each of said perforated sheets, said apertures being transversely aligned to define a transverse axis, and said means for removably mounting said sample holder within said enclosure includes a receptacle fixedly mounted between said perforated sheets, said receptacle including a cylindrical side wall positioned coaxially about said transverse axis and having a diameter slightly larger than the diameter of said sample holder side wall such that said sample holder may be coaxially received within said receptacle in said operative position.

9. The adsorber cell as defined in claim 8 wherein the transverse spacing between said top and bottom end walls of sample holder substantially corresponds to the transverse spacing between said perforated sheets of said enclosure, and wherein said receptacle further includes an inwardly directed circumferential flange adjacent one of said sheets for receiving one end of said sample holder thereon, and said means for removably mounting said sample holder within said enclosure further includes a ring cover plate adapted to overlie the other end of said sample holder, and means for removably attaching said ring cover plate to said receptacle adjacent the other of said sheets such that the sample holder may be retained in said operative position with one end resting upon said inwardly directed flange and the other end being contacted by said ring cover plate and wherein said sample holder may be inserted into and removed from said receptacle along said transverse axis upon removal of said ring cover plate.

10. The adsorber cell as defined in claim 8 wherein said receptacle side wall is divided along the transverse direction to define an arcuate fixed section and a removable cover section such that the cover section may be manually translated between a closed position and an open position, and whereby said sample holder may be inserted into and removed from said receptacle along a direction perpendicular to said transverse axis upon said cover section being translated to said open position.

11. The adsorber cell as defined in claim 10 wherein said receptacle further includes means for releasably maintaining said cover section in said closed position.

12. A gas adsorber cell for use in high efficiency gas cleaning systems and the like and having provision for obtaining a representative and undisturbed sample of the adsorbent material to permit periodic testing of the efficacy of the adsorbent material, said adsorber cell comprising an enclosure including first and second substantially flat, perforated sheets disposed in spaced apart, parallel relationship, said enclosure being adapted to receive an adsorbent material between said sheets such that a gas may be passed transversely through the sheets and adsorbent material, a first aperture in said first sheet and a second aperture in said second sheet, said apertures being transversely aligned to define a transverse axis lying perpendicular to said first and second sheets, a receptacle mounted within said enclosure and extending between said first and second apertures, said receptacle comprising a. a side wall disposed about said transverse axis and defining a forward end adjacent said first aperture and a bottom end adjacent said second aperture, and b. an imperforate flat bottom flange fixedly connected to said bottom end of said side wall and lying perpendicular to said transverse axis, said bottom flange including an outer edge positioned radially outside of said side wall of said receptacle to thereby define an outer flange portion overlying that portion of said second sheet immediately surrounding said second aperture and adapted to prevent the gas from channeling between the adsorbent material in said enclosure and said receptacle side wall, and said bottom flange further including an inner opening positioned radially within said side wall of said receptacle to define an inner flange portion, a sample holder adapted to be filled with an adsorbent material and comprising a side wall, a perforated top end wall, and a perforated bottom end wall spaced from and parallel to said top end wall, said sample holder being configured to permit the same to be received within said receptacle in an operative position along said transverse axis and with one of said top and bottom end walls supported by said inner flange portion of said receptacle such that said top and bottom end walls are positioned parallel to said first and second perforated sheets, and means for removably mounting said sample holder within said receptacle in said operative position, whereby a representative portion of the gas passing transversely through the adsorber cell passes through said sample holder, and the holder may be removed to permit the testing of the adsorbent material carried therein.

13. The gas adsorber cell as defined in claim 12 wherein said first and second sheets of said enclosure and said top and bottom end walls of said sample holder are each fabricated from a material having substantially the same percentage of open area such that the gas flow rate per unit area through said holder will be substantially the same as the gas flow rate per unit area through the remainder of said enclosure.

14. The gas adsorber cell as defined in claim 13 wherein said sample holder further includes an inwardly directed flange carried by said side wall at each end thereof and such that each of said inwardly directed flanges overlies the periphery of the adjacent end wall to substantially prevent the gas from channeling between the adsorbent material in said holder and said side wall thereof.

15. The gas adsorber as defined in claim 14 further including a sealing ring adapted to overlie said inner flange portion to thereby provide a gas tight seal between said bottom flange and the adjacent inwardly directed flange of said sample holder when said sample holder is positioned in said operative position.

16. The gas adsorber as defined in claim 15 wherein said receptacle further comprises an imperforate flat top flange fixedly connected to said forward end of said receptacle side wall and lying perpendicular to said transverse axis, said top flange including an outer edge positioned radially outside of said side wall of said receptacle to thereby define an outer flange portion overlying that portion of said first screen immediately surrounding said first aperture, said top flange further including an inner opening of a size to permit said sample holder to be inserted into said receptacle along said transverse axis.

17. A gas adsorber cell for use in high efficiency gas cleaning systems and the like and having provision for obtaining a representative and undisturbed sample of the adsorbent material to permit periodic testing of the efficacy of the adsorbent material, said adsorbent cell comprising an enclosure including first and second substantially flat, perforated sheets disposed in spaced apart, parallel relationship, said enclosure being adapted to receive an adsorbent material between said sheets such that a gas may be passed transversely through the sheets and adsorbent material, a first circular aperture in said first sheet and a second circular aperture in said second sheet, said apertures being transversely aligned to define a transverse axis lying perpendicular to said first and second sheets, a receptacle mounted within said enclosure and extending between said first and second apertures, said receptacle comprising a. a cylindrical side wall disposed coaxially about said transverse axis and defining a forward end adjacent said first aperture and a bottom end adjacent said second aperture, b. an imperforate circular flat bottom flange fixedly connected to said bottom end of said side wall and lying perpendicular to said transverse axis, said bottom flange including a circular outer edge coaxial with said transverse axis and having a diameter greater than that of said cylindrical side wall of said receptacle to thereby define an outer flange portion overlying that portion of said second sheet immediately surrounding said second aperture, and said bottom flange including a circular inner opening coaxial with said transverse axis and having a diameter less than said cylindrical side wall of said receptacle to define an inner flange portion, and c. an imperforate circular flat top flange fixedly connected to said forward end of said receptacle side wall and lying perpendicular to said transverse axis, said top flange including a circular outer edge coaxial with said transverse axis and having a diameter greater than that of said cylindrical side wall of said receptacle to thereby define an outer flange portion overlying that portion of said first sheet immediately surrounding said first aperture, and said top flange including a circular inner opening coaxial with said transverse axis and having a diameter substantially corresponding to that of said receptacle side wall, a sample holder adapted to be filled with an adsorbent material and comprising a cylindrical side wall, a perforated top end wall, and a perforated bottom end wall spaced from and parallel to said top end wall, said sample holder side wall having a diameter somewhat less than the diameter of said receptacle side wall such that said sample holder may be inserted into said receptacle along said transverse axis and through said top flange to thereby assume an operative position wherein one of said top and bottom end walls is supported by said inner flange portion of said receptacle and such that said top and bottom end walls are positioned parallel to said first and second perforated sheets, and means for removably mounting said sample holder within said receptacle in said operative position, whereby a representative portion of the gas passing transversely through the adsorber cell passes through said sample holder, and the holder may be removed to permit the testing of the adsorbent material carried therein.

18. The gas adsorber cell as defined in claim 17 wherein said means for removably mounting said sample holder within said receptacle includes a flat ring cover plate, said cover plate defining an outer edge having a diameter substantially corresponding to that of said outer edge of said top flange of said receptacle, and an inner opening having a diameter substantially corresponding to that of said circular inner opening of said bottom flange, and means for releasably connecting said cover plate to said top flange to thereby retain a sample holder within said receptacle in said operative position.

19. The gas adsorber cell as defined in claim 18 wherein said sample holder further includes an inwardly directed flange carried by said side wall at each end thereof, each of said inwardly directed flanges defining a circular opening having a diameter substantially equal to that of said circular inner opening of said cover plate.

* * * * *